US006735845B2

(12) United States Patent
Jonsson (10) Patent No.: US 6,735,845 B2
(45) Date of Patent: *May 18, 2004

(54) METHOD OF PRODUCING AN INTEGRATED REFERENCE PRESSURE SENSOR ELEMENT

(75) Inventor: Staffan Jonsson, Kariskoga (SE)

(73) Assignee: MKS Instruments Inc., Andover, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,833

(22) Filed: Aug. 20, 1999

(65) Prior Publication Data

US 2003/0110865 A1 Jun. 19, 2003

Related U.S. Application Data (63) Continuation of application No. PCT/SE98/00302, filed on Feb. 20, 1998.

(30) Foreign Application Priority Data

Feb. 20, 1997 (SE) .............................................. 9700612

(51) Int. Cl.[7] .............................. G01R 3/00; H01G 7/00
(52) U.S. Cl. ......................... 29/595; 29/25.41; 73/718; 73/724; 445/31; 438/402; 438/471
(58) Field of Search .......................... 29/595, 611, 613, 29/25.41, 594; 73/715, 718, 724; 445/31, 41, 55; 252/181.1, 181.2, 181.3; 219/604; 438/402, 471, FOR 144

(56) References Cited

U.S. PATENT DOCUMENTS 3,153,847 A * 10/1964 Lindberg ...................... 29/595
3,460,310 A * 8/1969 Adcock et al. ............. 219/604
4,008,619 A 2/1977 Alcaide et al.

(List continued on next page.)

FOREIGN PATENT DOCUMENTS

| EP | 275 844 | * | 7/1988 | .................. 445/55 |
| GB | 2044523 | | 10/1989 | |
| SU | 1362971 | * | 7/1986 | .................. 29/595 |

OTHER PUBLICATIONS

English Translation from Russian of SU 1362971, Semenov et al, Method for the Evacuation of Absolute–Pressure Sensors and Device for the Carrying Out of the Method, Dec. 1987.*
Derwent's abstract, No. 88–197466/28, week 8828, Abstract of SU, 1362971, Dec. 30, 1987.
Derwent's abstract No. 91–199892/27, week 9127, Abstract of SU, 1605145, Nov. 7, 1990.
Patent Abstracts of Japan, Abstract of JP 59–56970, Jul. 25, 1984.

Primary Examiner—A. Dexter Tugbang
(74) Attorney, Agent, or Firm—Nixon & Vanderhye P.C.

(57) ABSTRACT

A method of manufacturing a pressure sensor house assembly which contains a reference cavity, in which a vacuum exists, and a getter capable of being thermally activated. The getter is activated by directly contacting the getter with an exterior heated body, conducting heat from the exterior heated body, maintaining the exterior heated body in direct contact with the getter for a predetermined period of time, and removing the exterior heated body.

7 Claims, 7 Drawing Sheets

U.S. PATENT DOCUMENTS

| | | | |
|---|---|---|---|
| 4,302,063 A | | 11/1981 | Rudy |
| 4,334,725 A | * | 6/1982 | Teshima et al. .............. 445/31 |
| 4,587,851 A | | 5/1986 | Mortberg |
| 5,443,410 A | * | 8/1995 | Ko .............................. 445/55 |
| 5,544,490 A | * | 8/1996 | Manini et al. ........... 252/181.1 |
| 5,800,235 A | * | 9/1998 | Ragsdale ..................... 445/41 |
| 5,885,682 A | * | 3/1999 | Tanimoto et al. ........ 252/181.1 |
| 5,916,479 A | * | 6/1999 | Schiabel et al. ......... 252/181.3 |

\* cited by examiner

Fig.7b

METHOD OF PRODUCING AN INTEGRATED REFERENCE PRESSURE SENSOR ELEMENT

This application is a continuation of PCT International Application No. PCT/SE98/00302, filed Feb. 20, 1998, which claims priority of Swedish Patent Application No. 9700612-6, filed Feb. 20, 1997, the entire contents of which are hereby incorporated by reference in this application.

TECHNICAL FIELD

The present invention relates to sensor elements having integrated reference pressures for measuring pressures such as for absolutely measuring pressures and in particular low or small pressures and methods for producing such sensor elements.

BACKGROUND

Figure 1:
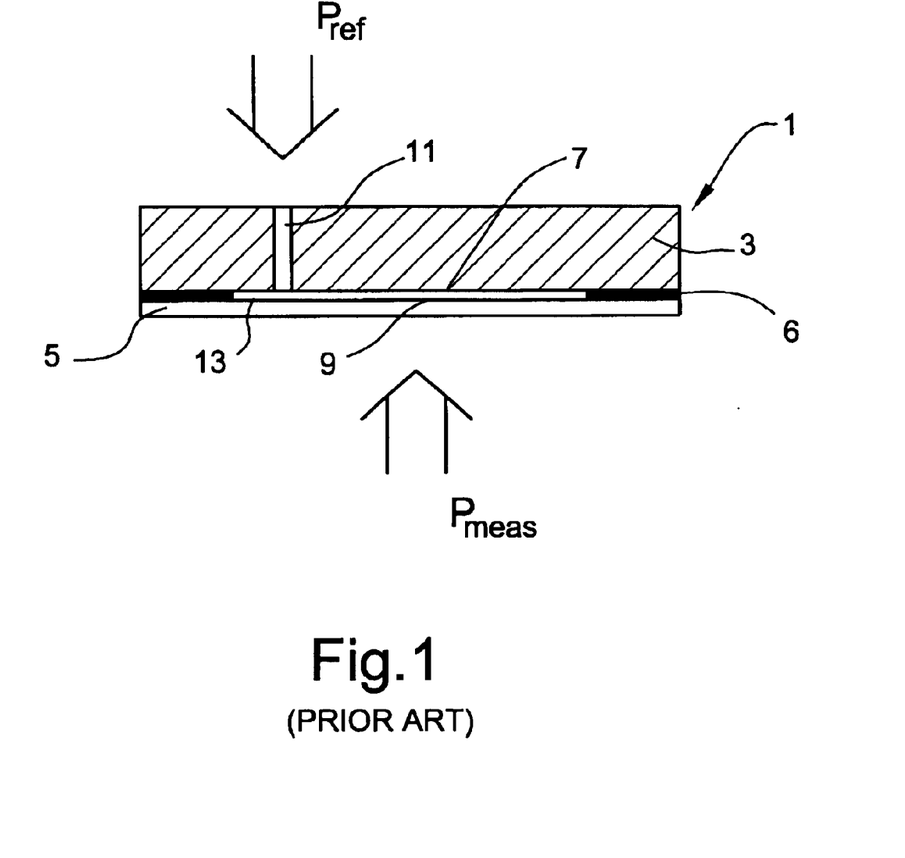
FIG. 1 is a sectional view of a previously known sensor element.

A ceramic capacity sensor element 1 for pressure sensing is usually constructed of two parts, see FIG. 1. These parts are a stable circular base plate 3 having typically a diameter of 20–30 mm and a thickness of 4–5 mm and a thinner circular plate 5, also called a diaphragm, having a movable central portion and mounted at one of the large surfaces of the base plate 3 and joined thereto by means of for example glass joints 6 at the circular edges of the diaphragm and base plate. The diaphragm 5 has the same diameter as the base plate and has a thickness which is adapted to the magnitude of the load to which the diaphragm is to be subjected. The change of the position of the central portion of the diaphragm 5 is detected as a change of the electrical capacitance between two electrodes 7, 9 of e.g. gold, which are located in parallel with and opposite each other and which are coated using thin film methods on the facing, inner surfaces of the base plate 3 and the diaphragm 5 respectively. The sensor element 1 can be used for different types of measuring pressures, in which the variable searched for is the pressure $P_{meas}$, which acts on the free, outer surface of the diaphragm 5 facing away from the base plate 3. The measurement is always made in relation to a reference pressure $P_{ref}$ in some form. Pressure sensors can be classified according to the way in which the reference pressure is formed. Thus the following types are obtained:

"a gauge-sensor" if $P_{ref}$=the atmospheric pressure
"an absolute sensor" if $P_{ref}$=technical zero pressure
"a differential sensor" if $P_{ref}$=a second pressure to be measured.

Of course, in a more strict sense all these types use a differential or relative measurement.

A gauge-sensor uses a circular hole 11 through the base plate 3 from the free surface thereof into the cavity 13 formed between the inner surfaces of the base plate 3 and the diaphragm 5 as a channel for conducting the ambient atmospheric pressure to the inner side of the diaphragm 5. If the pressures on the two sides of the sensor element of a gauge-sensor are equal and particularly the pressures on the two sides of the diaphragm 5 are equal, i.e. if $P_{meas}=P_{ref}$=the atmospheric pressure, the diaphragm 5 will rest in a flat position. If the pressure to be measured is larger than the reference pressure, i.e. if $P_{meas}>P_{ref}$, where $P_{ref}$=the atmospheric pressure, the diaphragm 5 will bend in towards the base plate 3 and the capacitance between the electrode surfaces 7, 9 will be changed, which is electrically detected.

If the inner cavity 13 between the base plate 3 and the diaphragm 5 and the channel 11 is evacuated from air and other foreign gases and is closed by e.g. a tin plug, a situation is obtained in which the pressure to be measured is for example of the magnitude of order of an ambient pressure, i.e. $P_{meas}$=the atmospheric pressure, and the reference pressure is substantially equal to zero (vacuum or technical zero pressure), i.e. $P_{ref}$=0. Here an exact zero pressure is not considered but a zero pressure which can be produced technically, i.e. of the magnitude of order of $10^{-6}$ torr.

The diaphragm 5 then bends in towards the base plate 1, since the pressure $P_{meas}$ to be measured, which then e.g. is approximately equal to the atmospheric pressure, is larger than the reference pressure $P_{ref}$. If the pressure $P_{meas}$ to be measured is increased to become larger than the atmospheric pressure, the diaphragm 5 bends even more in towards the base plate 3. If the pressure $P_{meas}$ to be measured instead is reduced from the atmospheric pressure in order to approach the vacuum range, the diaphragm bends less and less in towards the base plate. When the pressure to be measured reaches a technical zero pressure, i.e. $P_{meas}=P_{ref}$=technical zero pressure, the diaphragm 5 will rest in a flat position. This type of absolute sensor is apparently based on the fact that the inner reference pressure $P_{ref}$ is maintained intact and is maintained at a substantially constant, very low pressure during a long time period.

If e.g. air and/or other gases slowly leak into the sensor element 1 into the reference cavity 13 of the sensor element, the sensor element will gradually lose the possibility to operate as an absolute sensor. Leakage can take place by for example permeation of gas molecules through the ceramic material in the base plate and diaphragm, through the glass joint or through the tin plug which closes the channel 11. If the reference cavity 13 has a small volume, the increase of pressure therein can occur rapidly, which can be counteracted by increasing the volume of the cavity in order to for example also comprise a room on the top side of the base plate, which results in a more complex structure. The cavity can also be provided by some form of device, which maintains a correct level of the reference pressure $P_{ref}$ during a longer time. Such a device can e.g. be a "non-evaporable getter" (NEG), i.e. in principle a body of a gas absorbing material. A suitable choice can be a porous sintered material such as e.g. Zr and/or an alloy of Zr, V and Fe. The material can then act as a small in-situ vacuum pump, which absorbs foreign gases in the reference cavity. For an NEG integrated in the reference cavity a high qualitative reference pressure $P_{ref}$ of the magnitude of order of $10^{-8}$–$10^{-10}$ torr or lower is obtained.

Figure 2:
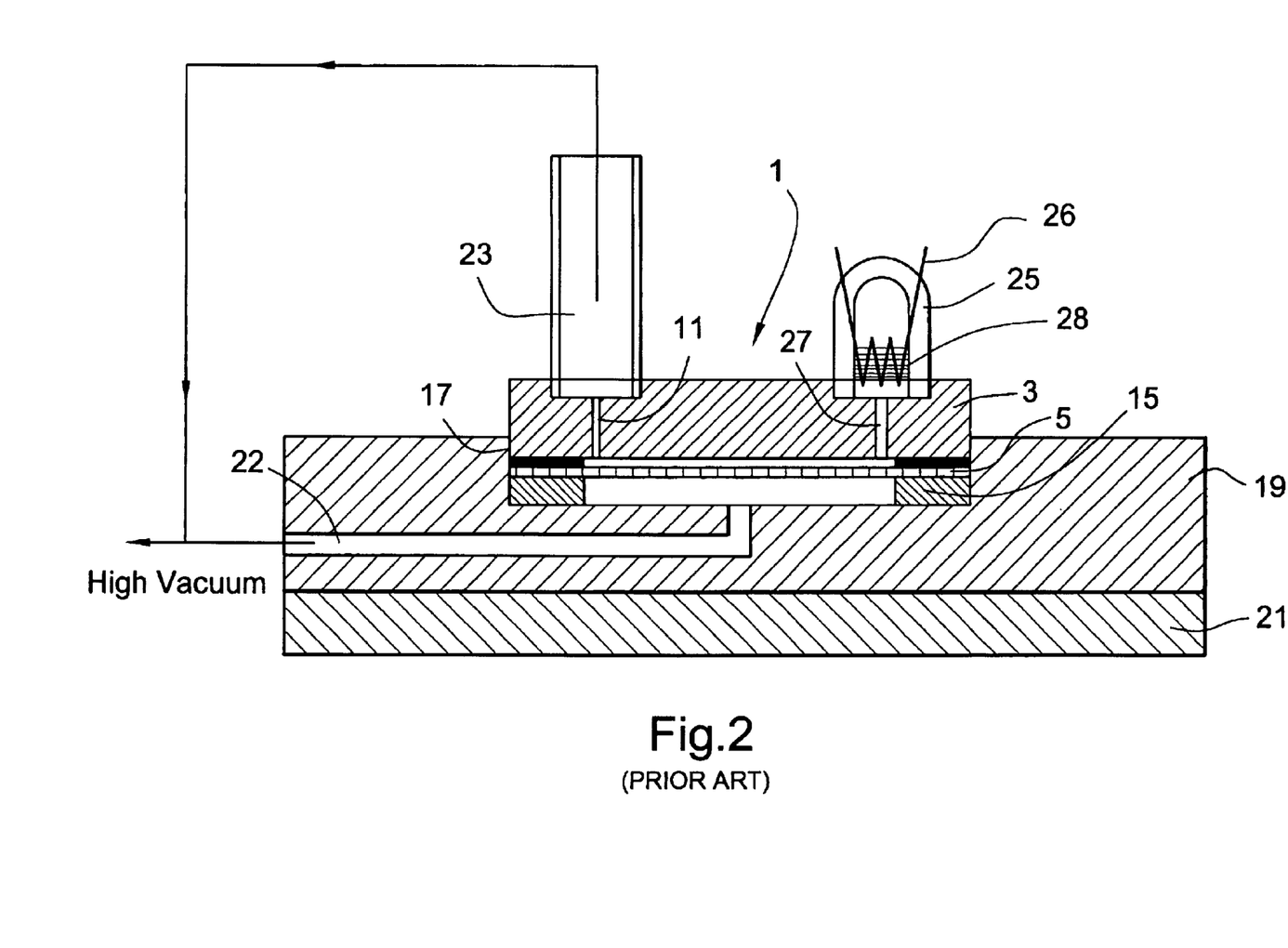
FIG. 2 is a sectional view of a previously known device having a sensor element mounted therein in order to execute the final steps when manufacturing a pressure sensor of absolute type having a separate getter and vacuum closing device.

An NEG is activated by specific high vacuum/temperature processes. If the activating process is executed for a sensor element, which mainly is under atmospheric pressure, it can be executed e.g. in the following way, see FIGS. 2 and 3. The sensor element 1, which is here provided with a stabilizing ring 15 mounted at the margin region of the diaphragm 5, see the published International patent application WO 95/28624, is mounted in a recess 17 in a jig 19, which is mounted on top of a heating plate 21. A channel 22 connects the free surface of the diaphragm 5 to a high vacuum pump, not shown. A tip-off tube 23 is attached in a recess in the free surface of the base plate 3 having a connection to the channel 11. The tip-off tube 23 is connected to the high vacuum pump so that the inner surface of the diaphragm will also be subjected to the vacuum. Thereby the diaphragm will be located in a flat position all the time during the activation and closing and will be exposed to minimum mechanical stresses. The sensor element 1 is slowly heated to temperatures about 200–300° C., by energizing the heating plate 21. Gas molecules inside the reference cavity 13 and at the surfaces of the cavity are "shaken" and thus detached from the surfaces and are then pumped out by the high vacuum pump. The tip-off tube 23, which can be made of e.g. copper or glass, is closed by heating it locally to a very high temperature and then pinching it off, when this so called bake-out procedure is finished.

A closed getter tube 25 is mounted in another low recess on the free surface of the base plate 3, the recess being connected to a second channel 27 extending in to the reference cavity 13. The getter tube can made be of e.g. copper or preferably of glass and contains an NEG 28 having the shape of a rod, which is located in a transverse position inside the getter tube 23 and has a resistive inert wire 26 of e.g. platinum wired around it. The platinum wire 26 is introduced in an electrically isolated way through the getter tube, for example molten into glass, in the case the tube 25 is made thereof, so that an electric current can be conducted through the wire 26. The resistive wire 26 can also be integrated in the NEG-element 28 and then be located inside it. The capability of the NEG-element 28 of in-situ pumping (strictly absorbing) gas molecules is activated by the gradual heating. When the bake-out approaches its end, first the tip-off tube 23 is closed, see 29 in FIG. 3, and then a short, intense final activation of the NEG-element 28 is executed. A current is now conducted through the platinum wire 26, which then starts to glow and intensely increases the temperature of the NEG-element 28. This temperature increase of the NEG-element 28 results in a final activation of the NEG-element, which thereby increases its capability of absorbing foreign undesired gases in the reference cavity.

Figure 3:
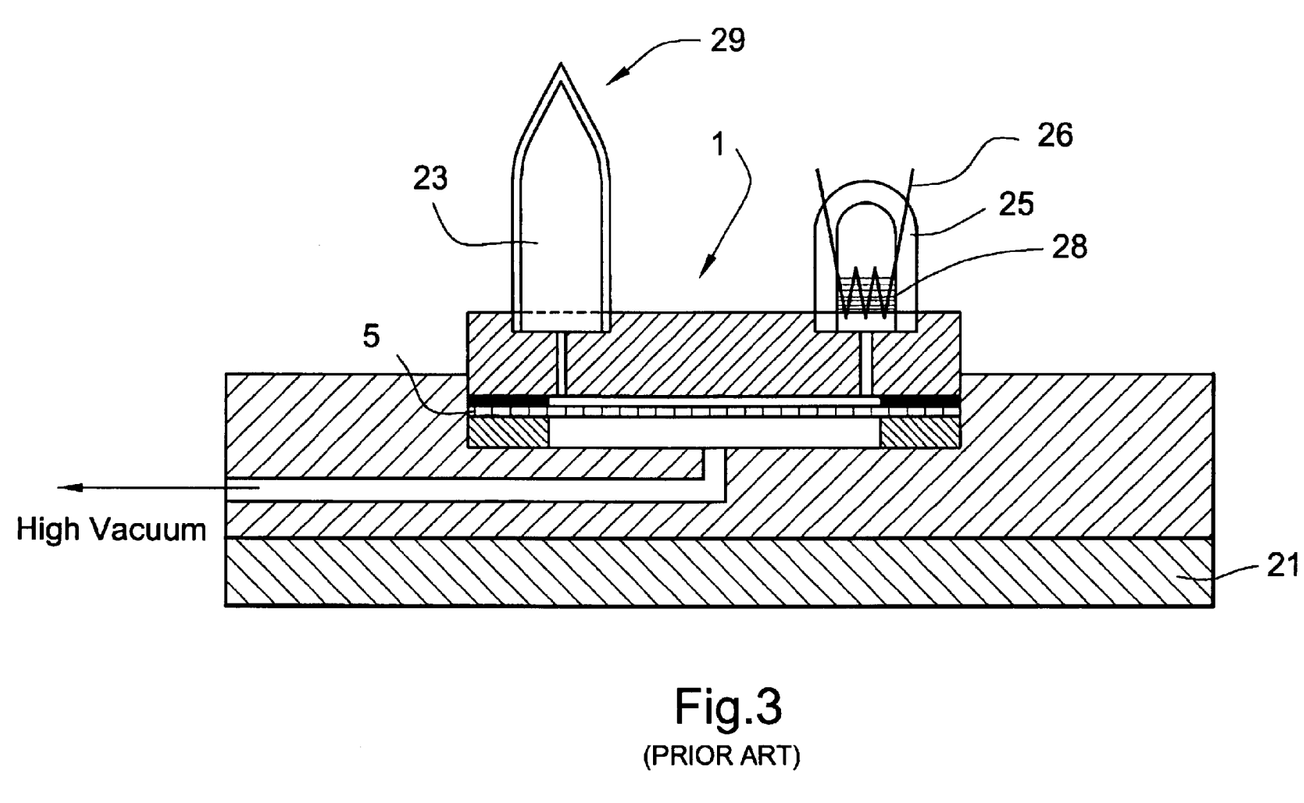
FIG. 3 is a sectional view similar to that of FIG. 2 but in which the cavity of the sensor element has been closed.

The obtained reference pressure is of the magnitude of order of $10^{-8}$–$10^{-10}$ torr. The NEG-element 28 will maintain its function also when the entire sensor element 1 and then also the NEG-element included therein has cooled to ambient temperature. The function is maintained until the NEG-element 28 has been saturated with foreign gases originating from e.g. leakage into the cavity. If impermeable ceramic materials are used, the saturation time of the getter will clearly exceed the commercial technical lifetime of the element. A reference cavity in which e.g. an NEG-element according to the discussion is used provides a high qualitative pressure having a long lifetime. However, the process, which has been described above, has a number of complications and disadvantages as to the production method, the design and the method of operation.

SUMMARY

It is an object of the invention to provide a sensor element design having a low, accurately defined reference pressure and to provide a method of producing it and in particular to obtain a high qualitative reference pressure to be used also in a minimum reference cavity in the sensor element.

It is another object of the invention to provide a sensor element, which has a simple, vacuum tight closing of a reference cavity and which thereby obtains a configuration which can be easily handled and has substantially no projecting parts.

The problems associated with gases leaking into the reference cavity thereby shortening the lifetime of the sensor element can be overcome by an enlargement of the reference cavity as described above. This can result in the draw-back mentioned above comprising that a more complex design is obtained. Therefore it is preferred that an in-situ operating unit of the type wherein an NEG-element is used for capturing foreign gases in the minimum reference cavity, as will be described hereinafter. Also the choice of materials in the different components of the sensor elements has importance for maintaining the reference pressure and this is in particular true in regard of leakage of inert gases such as helium into the cavity.

The sensor element is preferably built of a ceramic material, which mainly consists of an amorphous glass phase and a crystalline phase, i.e. the material is of a glass ceramic type material. Glass ceramic materials have the advantage of being very impermeable to gases and in particular also to helium. However, glass ceramic materials have a disadvantage, in the respect of some types of long time mechanical behavior and this is in particular true for very thin diaphragms. As very thin diaphragms, diaphragms having thicknesses of less than 0.1 mm (<100 µm) are considered. This type of thin diaphragms is of interest in e.g. measurement of very small pressure differences or pressures in e.g. ventilation applications or gas measurements in a vacuum. One can then advantageously use diaphragms of aluminium oxide manufactured in some suitable way. Also other plates included in the sensor element can then be manufactured of aluminium oxide, which in particular is true for the shielding plate.

A compact pressure sensor of the capacitive and absolute type includes a pressure sensor house assembly. The assembly contains a reference cavity in which a high vacuum exists and is thus an absolute pressure sensor according to the discussion above. The sensor house assembly has in principle the same small outer dimensions as a sensor house assembly used in gauge-type and differential pressure sensors, for which no closed reference cavities are required. This means that for plate-shaped sensors the reference cavity has a small volume. The pressure sensor house comprises an upper thick base plate, a thinner shielding plate and a movable thin diaphragm. A low, small cavity is formed between the shielding plate and the diaphragm. A narrow channel extends from the cavity to the outside of the assembly and forms together with the cavity the reference cavity. At the mouth of the channel a recess is provided, in which an elastically arranged getter body which is capable of being thermally activated is placed. A portion of the surface of the getter body is a wall surface in the reference cavity. A closing lid having a low projecting profile is arranged in a gastight way in the recess and is engaged with the getter body. When simultaneously closing the reference cavity and activating the getter body the lid is attached to a heating probe at some distance from the sensor house and the getter body is located in the recess. The whole assembly is placed in a vacuum chamber and the temperature is then increased to the temperature at which the getter starts to be activated, and thereupon the probe is moved to a position in which the closing lid is in contact with the getter body but not in tight contact with the sensor house. The temperature of the probe is increased further for a final activation and in order to melt the joint material on the lid. Heat is then conducted through the lid to the getter body. Thereupon the lid-is moved to be attached to the house in a tight and sealed way and is fixed in this position.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 7b is a plan view of the spring washer in FIG. 7a, and FIG. 8 is a sectional view of a device for producing a pressure sensor of absolute type having a sensor element mounted therein.

DETAILED DESCRIPTION

Figure 4A:
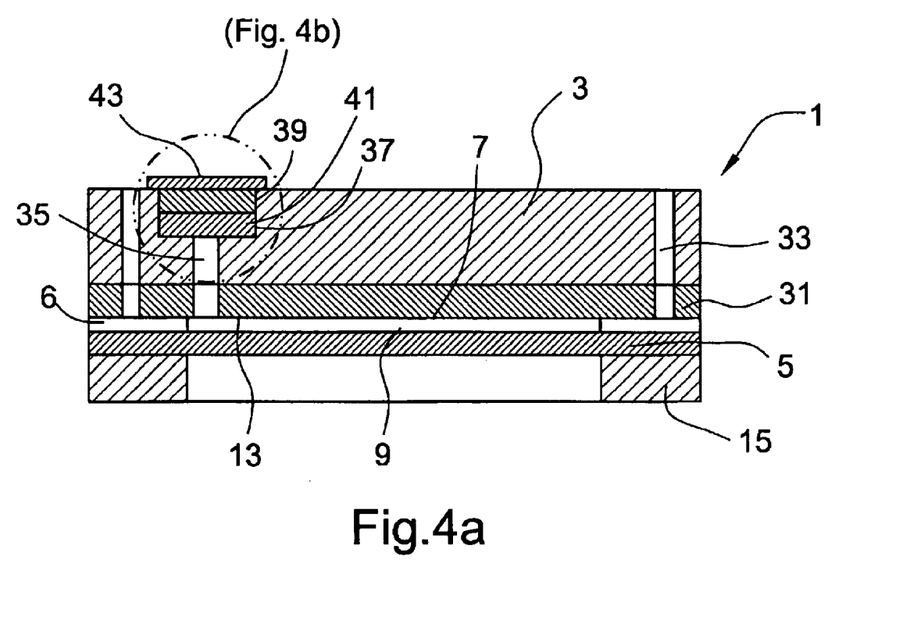
FIG. 4a is a sectional view of a pressure sensor of absolute type having a combined mounting of getter and vacuum closing device.

In FIG. 4a a sensor element 1 is shown constructed of three circular flat plates, a base plate 3, a diaphragm 5 and a shielding plate 3 arranged between the base plate and the diaphragm and a front ring or front plate 15 associated with the sensor element and arranged at a marginal region of the free surface of a diaphragm 5 for reinforcing mechanically the diaphragm, see the above-cited International patent application WO 95/28624 and also the published International patent application WO 95/28623. All parts are concentrically arranged and have the same exterior diameter. In the base plate 3 and the shielding plate 5 a number of circular holes 33 are arranged for letting electrical conductors through, which holes are arranged on top of each other for forming through-channels into the joint region 6, and holes 35 also arranged straight on top of each other, so that a channel into the reference cavity 13 is obtained. At the free surface of the base plate a recess 37 is provided, which is concentric with the reference cavity holes 35 and has a larger diameter than that of these holes.

Figure 4B:
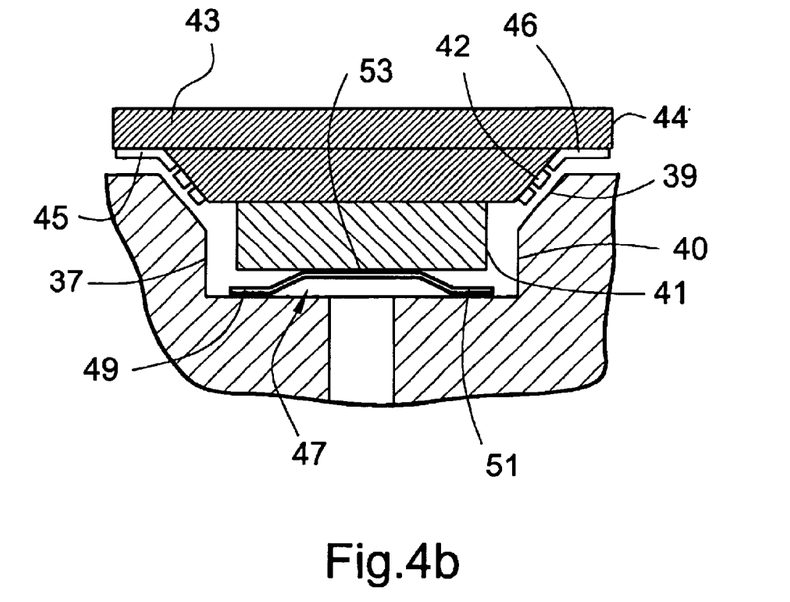
FIG. 4b is a partial sectional view in a larger scale of the pressure sensor in FIG. 4a, which shows the vacuum closing device including a getter before closing.
Figure 6:
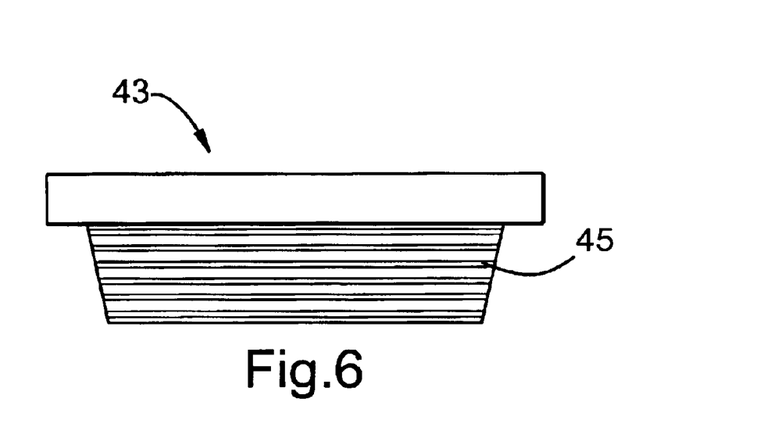
FIG. 6 is a side view of the closing lid in FIG. 5.

The recess 37 can have a suitable depth and for example extend in to approximatively half the thickness of the base plate 3. Furthermore, the recess 37 can have some suitable shape. For example, it can have a top or edge region 39 bevelled to some suitable angle, for example an angle of about 45° C. as illustrated in FIG. 4b, and an axial length corresponding to for example about half the depth of the recess 37. The edge region 39 can also have other angles and it can often be advantageous that it forms an angle rather close to 90° to the surface of the base plate 3, compare also the configuration of the corresponding lid in FIG. 6, so that the angle of the walls of the strictly speaking frusto-conical top region can be within the range of 45–85° in relation to the surface of the base plate 3. The lower portion 40 of the recess 37 can have circular-cylindrical shape. In the recess 37 an NEG-element 41 is mounted with a closing device comprising a getter lid 43, see in particular FIG. 4b and also FIG. 6.

In the cylindrical portion 40 of the recess 37 in the sensor element thus the NEG-element 41 is located and has for example the shape of a cylindric washer. The getter lid 43 is attached the circular frusto-conical, bevelled region 39 and a circular annular region of the exterior surface of the base plate 3 surrounding opening of the recess 37. The getter lid rests with its bottom surface against the top side of the NEG-element 41. The getter lid 43 has a shape corresponding to the shape of the regions to which it is attached. It thus has a lower frusto-conical portion 42 and an upper cylindric, plate-shaped portion 44, which laterally extends over the conical portion and thereby at its bottom forms a circular annular surface 46 engaged with the free surface of the base plate 3 at the region thereof at the recess 37. The cylindrical portion 44 of the getter lid thus forms a low projection on the top side of the base plate. The height of this projection can be very small and is in most cases smaller than the thickness of any plate 3, 31, 5 forming the main building blocks of the sensor element 1. It is also possible to make the getter lid as a purely frusto-conical body omitting the top cylindrical portion 44 of the lid. Then the sensor element 1 will have a completely flat surface without any projecting or protruding parts. The getter lid 43 can be made of a ceramic material or of special metal alloys.

To the circular annular bottom surface 46 of the cylindrical portion 44 of the getter lid 43 and to the circular frusto-conical portion of the getter lid, glass material 45 is applied by means of screen printing or by means of pad/brush printing for forming a glass joint. The glass joint material 45 is applied to the surfaces of the getter lid in the shape of a dotted pattern. The glass joint material is thus applied by means of printing, is then dried and is finally sintered before the final heating in order to "burn" the components to each other, when a glass joint is formed and the getter lid 43 is glassed to the corresponding surfaces of the base plate 3. Bake-out and activation of the NEG-element and finally the closing of the reference cavity is made in a chamber, in which a vacuum pressure of the magnitude of order of $10^{-6}$–$10^{-8}$ torr exists, as will be described in detail hereinafter.

The glass joint material 45 sintered on the getter lid 43 contains substances and occlusions of some gas or gases, which are evaporated or released respectively during a heating procedure called bake-out executed directly before the final activation of the NEG-element and the closing ("tip-off") of the reference cavity. When the sensor element 1 and the getter lid 43 comprising glass joint material each but simultaneously are located in a high vacuum chamber, this degassing and release of non-desired gaseous substances can be very sudden and abrupt. Sudden gas explosions of gas enclosed in the glass joint material 45 can destroy the finished glass joint. For the purpose of counteracting this effect the glass joint material 45 is applied as a dotted pattern. The dotted pattern facilitates the transport of gas molecules out of the glass joint material to the high vacuum chamber in order to then be removed by a high vacuum pump. The dotted pattern further results in the glass joint material 45 at the peak temperature of the process flowing out and/or forming a thinner joint than what can be obtained from a uniformly thick layer of joint material. The obtained thin joint reduces temperature induced mechanical stresses in the finished sensor element.

Figure 5:
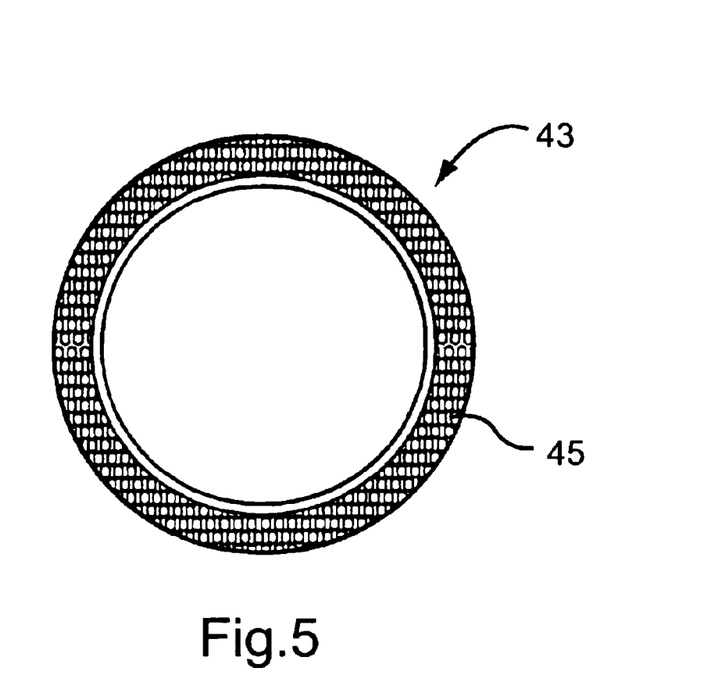
FIG. 5 is a view from below of a closing lid having joint material arranged on contact surfaces.

The glass joint material 45 can be applied in different kinds of dotted patterns. The glass joint material, which is located on the circular annular bottom region 46 of the getter lid, has a preferred pattern of small regular hexagons, see FIG. 5. The glass joint material 45 on the circular frustoconical portion 42 of the getter lid 43 has as a preferred pattern circular narrow rings, which are concentric with each other and with the getter lid, see FIG. 6.

Figure 7A:
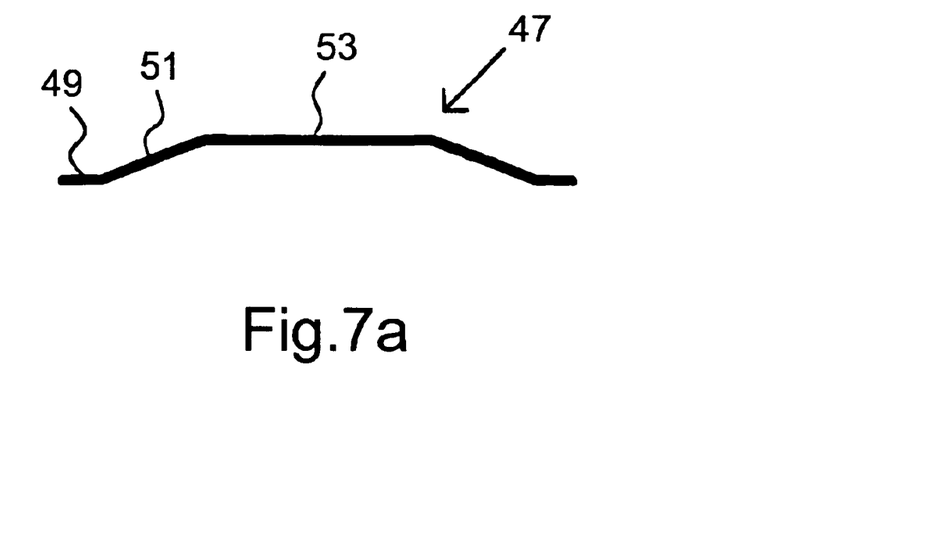
FIG. 7a is a sectional view of a spring washer.
Figure 7B:
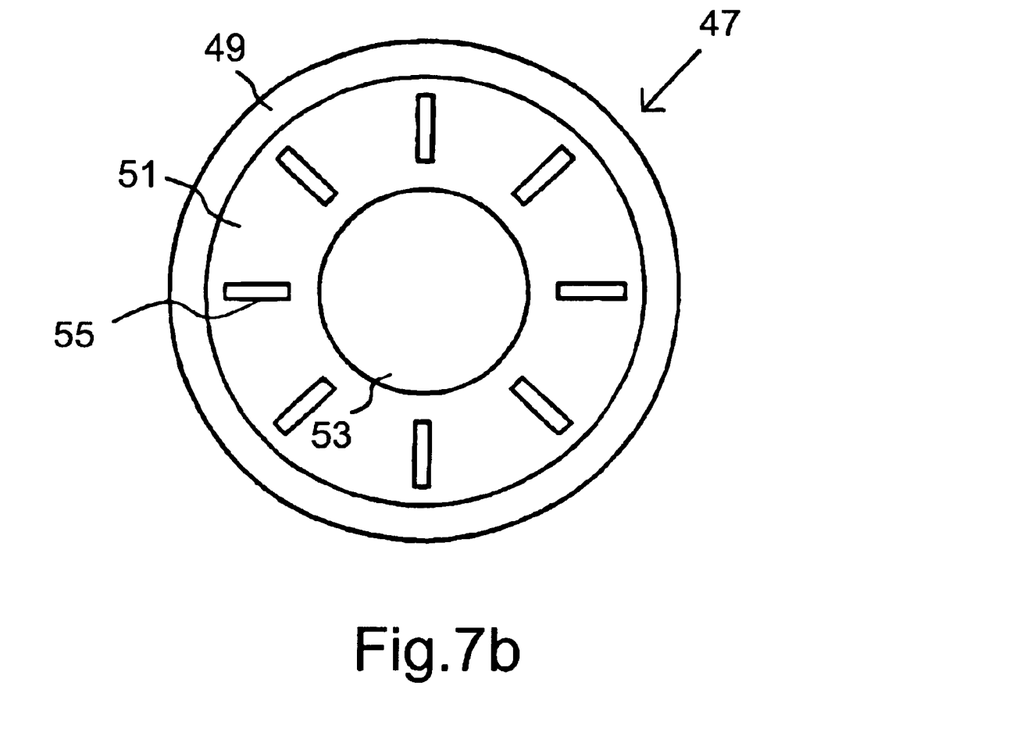

The NEG-element 41 rests against a spring washer 47 made of an inert material, which is placed on the bottom of the recess 37. The spring washer 47 lifts the NEG-element 41 somewhat, so that a slot is formed between the getter element and the bottom surface of the recess 37 in the base plate 3. Gas molecules, which are "shaken" and thus detached during the final activation of the NEG-element 41, can thereby leave the reference cavity and be pumped away by the high-vacuum pump. The spring washer 47 can be etched or laser cut to the correct configuration, see FIG. 7. The portion 49 of the bottom side of the spring washer 47, which rests against the bottom of the recess 37, consists of a flat circular ring at the edge of the washer 47. This portion 49 continues at its inner edge into a frusto-conical ring 51, which extends upwards from the exterior circular ring 49 and at its upper edge, having a smaller diameter, is terminated in a flat, inner circular whole portion 53, which rests against the bottom side of the NEG-element 41. The portion 51 having the shape of a frusto-conical ring contains a number of recesses and slots 55 etched in uniformly spaced, radial directions.

The slots 55 make a transport of molecules from the reference cavity possible and they in addition reduce the conduction of heat between the getter material 41 and the base plate 3 when during bake-out and final activation pumping foreign gases away from the inner of the reference cavity. The reference cavity generally comprises the space 13 between the diaphragm 5 and the shielding plate 3 and the circular channel formed by the holes 35 up to the bottom of the recess 37.

Figure 8:
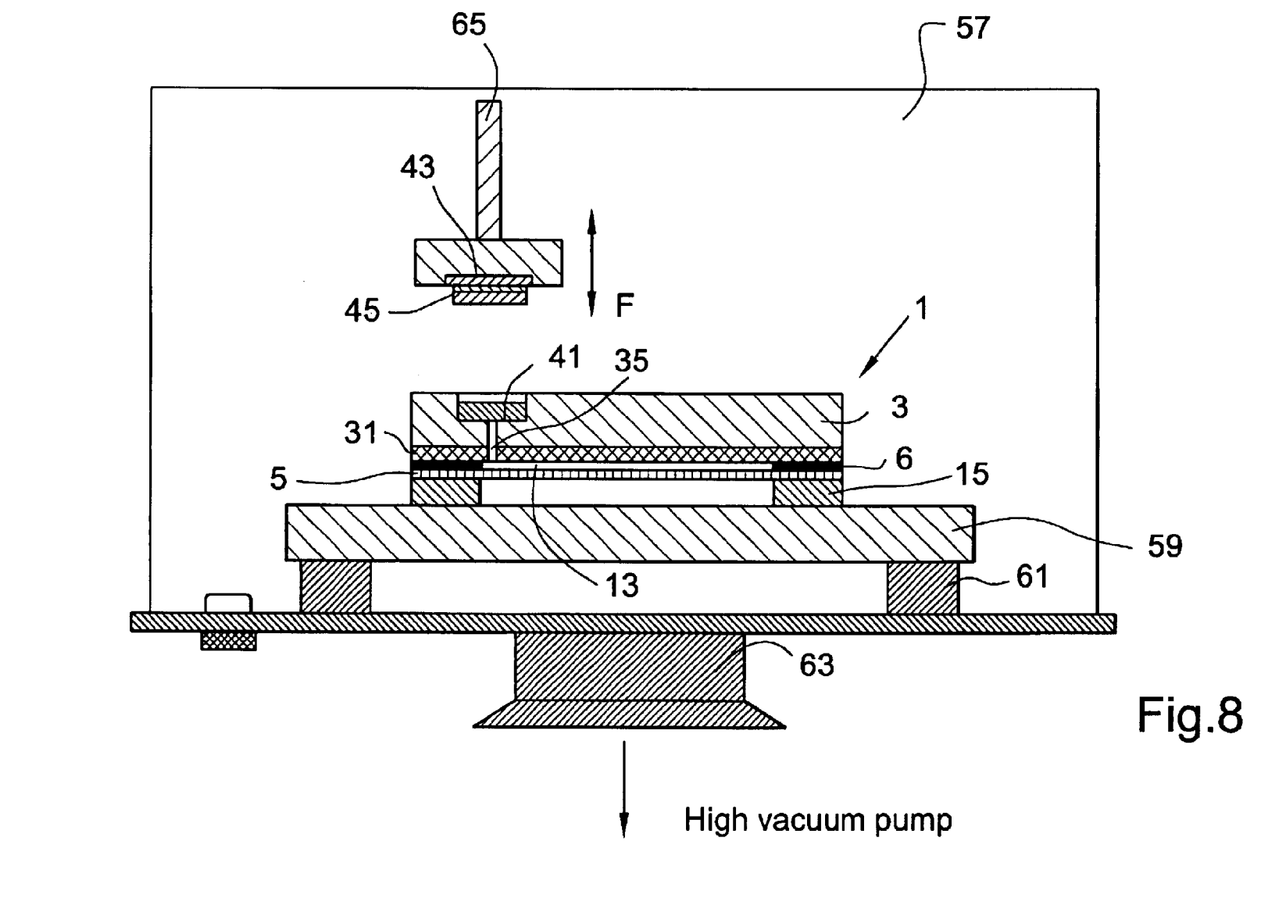

The above-mentioned bake-out of the reference cavity and of the glass joint material, activation of the NEG-element and closing the reference cavity are executed in a high-vacuum chamber 57, see FIG. 8, and will now be described in detail. The sensor element 1 is placed resting with its support ring 15 against a heating plate 59, which rests on support blocks 61 on the bottom of the high-vacuum chamber 57, which is connected to a high-vacuum pump, not shown, by an outlet 63 centrally at its bottom. The getter element 41 rests on the spring washer 47 in the recess 37. The getter lid 43 is at the start located at a distance from the sensor element 1. It is attached to the bottom surface of a heating probe 65, which is also located in the high-vacuum chamber and can be moved and operated therein. The heating probe 65 is provided with its own separate integral heating means, not shown, which are activated later during the procedure. The sensor element 1 is slowly heated to 200–300° C. during about 1–2 hours by supplying energy to the heating plate 59. The temperature is then maintained constant for 1–2 hours, the high vacuum pump then working for pumping away the released gases.

The heating probe 65 having the getter lid 43 retained thereby also follows the temperature of the heating plate 59 during the heating and the bake-out. The NEG-element 41 is gradually activated during the slow temperature increase. At the end of the bake-out period the heating probe 65 together with the getter lid 43 and the glass joint material 45 applied to the lid is lowered towards the opening of the recess 37 and towards the upper surface of the NEG-element 41. During the final phase, when the heating probe 65 is lowered to the NEG-element 41, the temperature of the heating probe is increased rapidly by activating its own heating source up to the temperature at which the glass joint material 45 on the getter lid 43 flows. At the same time the bottom surface of the central, projecting portion 42 of the getter lid 43 is made to come in contact with the top side of the NEG-element 41, whereby the temperature of the NEG-element rapidly increases. The peak temperature of the heating probe 65 is then allowed to finally activate the NEG-element 41 during about six minutes.

The heating probe 65 is during this period pressed down to the NEG-element 41. During the first two minutes of the final activation of the NEG-element 41 the slot formed between the getter lid 43 and the walls of the recess 37 must be somewhat open. Thereupon the getter lid 43 including the now flowing glass joint material 45 is pressed down further into the recess 37, so that the glass joint material 45 on the circular ring 46 under the top cylindrical portion of the lid and on the frusto-conical surface 42 comes in contact with corresponding surfaces on the top side of the base plate 3 and in the recess 37, whereby the reference cavity is closed. The NEG-element 41 has such a thickness that then its bottom surface presses the projecting portions of the spring washer 47 down nearly to the bottom of the recess 37 in the base plate 3. The recess 37 and the spring washer 47 are designed so that however a small slot remains between the central portion of the bottom surface of the spring washer 47 and the bottom surface of the recess 37, when the getter lid 43 is pressed down to be engaged with corresponding portions of the base plate 3 and in particular the circular frusto-conical portion 39 of the recess 37.

The heating probe 65 is maintained at the peak temperature for four minutes more for final activation of the NEG-element 41 and closing the reference cavity. After executing heating, bake-out, final activation and closing the reference cavity, the temperature of the now gettered sensor element 1 is slowly lowered, the temperature decrease taking place during a number of hours.

The procedure thus has the following main steps:
1. The sensor element 1 is placed in the high vacuum chamber 59 on the heating plate 57. The getter lid 43 including glass joint material 45 is attached to the heating probe 65. The high vacuum chamber 57 is evacuated by the high vacuum pump.
2. The temperature of the heating plate 59 and the heating probe 65 is increased slowly and is maintained constant during a long period.
3. The temperature of the heating probe 65 is increased at the same time as the heating probe is moved down to be engaged with the top surface of the NEG-element 41. After a short period of time the getter lid 43 is pressed down into the recess 37 in the base plate 3.
4. The temperature of the heating probe 65 is lowered to the temperature of the heating plate 59 and thereupon the temperature is lowered to the ambient temperature.

In the procedure as described above the final gettering of the NEG-element is made during six minutes. However, in practical embodiments of the procedure the specific circumstances during the heating process must be considered. A delicate thermal balance exists between the heating probe and the heating plate in the high vacuum chamber and the control of the heating must be very accurate. A correct control can shorten the time but in many cases the period of time required for the final gettering is longer than that mentioned above and can in practical cases amount to 30–40 minutes. In principle there are no effects adverse to the sensor element associated with using long activation periods. However, for production reasons all processes involving heating should of course be as short as possible.

Instead of using a heating probe as described above, the closing lid can be attached to some other operating means which can move the lid down to the recess. The intense heating required in the final stage of activating the getter can be provided to the lid in some other way, such as by means of laser radiation or IR-radiation.

In the heating process the bake-out and the final activation of the getter material can be performed at the same time, or even all components of the pressure sensor element can be finally attached to each other. However, in many cases a divided process is to be preferred. Then the components of the sensor element 1 are already attached to each other by a previous heating process. A condition thereof is that the already formed joints in the sensor element will not be affected by the later heating treatment. Practically then, e.g. the glass joint 6 between the diaphragm 5 and the shielding plate 7 must have melting characteristics different from those of the material of the joint 45 between the lid 43 and the base plate 3. Thus, the joint 6 can comprise a high temperature glass and the material of the joint 45 a low temperature glass.

In a practical example of producing a sensor element a getter material was used which is satisfactorily activated at 400° C. A high temperature glass was used in the joint 6. It had a melt temperature of 630° C. and started to soften at 500° C. A low temperature glass having a melt temperature of 470° C. was used in the joint 45. However, for making the low temperature glass material to appropriately flow in the joint for sealing and attaching the lid, a temperature of 550° C. is required. The following heating procedure was used:

The temperature of the heating plate 59 and the probe 65 was slowly raised to about 350° C., the system then being baked-out and the joints being degassed. The heating plate 59 was then maintained at 350° C. The temperature of the heating probe 65 was increased to 550° C. and the lid attached thereto was then moved to contact the getter body 41 and the base plate 1 in order to be attached to the latter one. Then a temperature gradient exists over the sensor element from 550° C. down to 350° C. The glass joint 6 can cope with this when carefully controlling the system. The reason thereof is the positive thermal characteristics of the ceramic materials, in particular a combination of heat capacity, density and thermal conductivity of the materials.

According to the description above, an absolute pressure sensor element has been presented which has a compact shape and a low, accurately defined reference pressure in a minimum reference cavity. The sensor element has a simple, vacuum tight closing of a reference cavity.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A method of producing a pressure sensor comprising a pressure sensor house assembly which contains a reference cavity, in which a vacuum exists, and furthermore comprising a getter capable of being thermally activated, the method comprising activating the getter by directly contacting the getter with an exterior heated body that is heated via a heat source, conducting heat from the exterior heated body, maintaining the exterior heated body in direct contact with the getter for a predetermined period of time, and removing the heat source and sealing the pressure house assembly with the exterior heated body, wherein the method further comprises:
producing the pressure sensor house of substantially ceramic material having the reference cavity arranged therein and a single closing channel from a main portion of the reference cavity to a mouth at the outside,
pumping air out of a room containing the pressure sensor house, so that a vacuum is obtained therein and in the reference cavity,
arranging a glass joint material on a closing lid, the glass joint material being capable of being thermally activated, the arranging step being practiced by arranging the joint material in a dotted pattern on the closing lid to allow gases that come into contact with the closing lid to be let out via a slot formed at a surface of the joint material,
heating the closing lid and placing the closing lid over the mouth of the closing channel, and
allowing the closing lid to cool.

2. A method of producing a pressure sensor comprising a pressure sensor house assembly containing a reference cavity, in which a vacuum exists, the method comprising:
producing a pressure sensor house including the reference cavity, which comprises an opening or a channel from a main portion of the cavity to outside the sensor house,
placing a getter capable of being thermally activated so that at least a portion of a surface of the getter forms a wall surface of the reference cavity,
attaching a closing lid to a body at a distance from the pressure sensor house so that gas can freely pass between the body comprising the lid attached thereto and the pressure sensor house,
increasing a temperature of the body and then of the closing lid to a temperature at which the getter is activated,
moving the body to such a position that the closing lid is applied tightly to the pressure sensor house and is attached in this position to the pressure sensor house and that then at least one of the body and the lid conducts heat to the getter, and
releasing the body from the closing lid.

3. The method according to claim 2, wherein before increasing the temperature of the body, the method comprising placing the pressure sensor house in a room and pumping air out of the room to become substantially a vacuum.

4. The method according to claim 2, wherein the step of increasing the temperature of the body is practiced by increasing the temperature of the body to a temperature at which the getter starts to be activated to a substantial extent and by maintaining the body at this temperature during a time period that effects a substantial activation of the getter.

5. The method according to claim 4, further comprising, prior to moving the body to the position in which the closing lid is applied tightly to the house, the step of increasing the temperature of the body further during a short period of time to produce a final activation of the getter.

6. The method according to claim 2, further comprising applying a sealing adhesive which is capable of being thermally activated to the closing lid in order to seal and attach the closing lid to the pressure sensor house.

7. A method of producing a pressure sensor including a pressure sensor house assembly comprising a reference cavity, in which a vacuum exists, the method comprising:

producing a pressure sensor house of substantially ceramic material having the reference cavity arranged therein and a single channel extending from a main portion of the reference cavity up to a mouth at an outside of the pressure sensor house, pumping air out of a room containing the pressure sensor house so that a vacuum is obtained therein and in the reference cavity, heating a closing lid including a joint material, which is arranged thereon and can be thermally activated, and then placing the closing lid on top of the mouth of the channel, and allowing the closing lid to cool, wherein, prior to the heating step, the method further comprises a step of arranging the joint material in a dotted pattern on the closing lid thereby allowing gases released in the heating step in the engagement of the closing lid with the pressure sensor house to be let out from a slot formed at a surface of the joint material.

* * * * *